United States Patent [19]

Watkins

[11] Patent Number: 4,915,184

[45] Date of Patent: Apr. 10, 1990

[54] CUSHIONING MECHANISM FOR STAIR-CLIMBING WHEELCHAIR

[75] Inventor: Baxter R. Watkins, Foster City, Calif.

[73] Assignee: Quest Technologies Corp., Sunnyvale, Calif.

[21] Appl. No.: 205,404

[22] Filed: Jun. 10, 1988

[51] Int. Cl.$^4$ .............................................. B62D 55/04
[52] U.S. Cl. ..................... 180/8.2; 180/8.7; 180/9.1; 180/9.3; 180/9.32; 180/907; 297/DIG. 4
[58] Field of Search .................... 180/8.1, 8.2, 8.3, 8.7, 180/8.4, 8.5, 9, 9.1, 9.21, 9.22, 9.26, 9.28, 9.3, 9.32, 9.34, 9.62, 907, 9.36; 280/5.2, 5.22, 5.28, 5.32; 297/DIG. 4

[56] References Cited

U.S. PATENT DOCUMENTS

| | | | |
|---|---|---|---|
| 4,564,080 | 1/1986 | Pagett | 180/9.28 |
| 4,614,246 | 8/1986 | Masse et al. | 180/907 |
| 4,671,369 | 6/1987 | Tiffin et al. | 180/8.7 |
| 4,674,584 | 6/1987 | Watkins | 180/907 |

*Primary Examiner*—David M. Mitchell
*Assistant Examiner*—Richard Camby

*Attorney, Agent, or Firm*—Townsend and Townsend

[57] ABSTRACT

A latch for each of a pair of cushioning arms, respectively, of a stair-climbing wheelchiar. The latch for each arm includes a first member coupled to the arm and a second member coupled to a fixed support of the wheelchair, with the second member being coupled to the armature of a solenoid which is energized to unlatch the arm from latched relationship with the support when it is desired to use the arm for cushioning purposes. An ultrasonic transducer coupled to the wheelchair adjacent to each latch, respectively, provides signals to energize the respecting latch solenoid when the arm is to be unlatched. To latch each arm, the adjacent edge margins of the two members are bevelled so that, during upward movement of the arm, such as by movement of the wheelchair from an inclined position to a horizontal position, the members are spread apart and a first spring biases the two members back together in coupled relationship to each other. When the latch solenoid is energized, the second member is moved away from the first member to allow a second spring to pull the arm down and into an unlatched position. A limit switch senses when each arm is latched.

13 Claims, 4 Drawing Sheets

CUSHIONING MECHANISM FOR STAIR-CLIMBING WHEELCHAIR

BACKGROUND OF THE INVENTION

1. Field of the Invention

This invention relates to improvements in wheelchairs and similar movable objects and, more particularly, to a stair-climbing wheelchair having means for cushioning the movements of the wheelchair as it moves from an inclined position to a horizontal position or from a horizontal position to an inclined position.

2. Description of the Prior Art

An improved wheelchair for climbing stairs and inclined ramps has been described in U.S. Pat. No. 4,564,080. The wheelchair has ground-engaging wheels and a pair of endless flexible tracks which are alternately in engagement with the surface below the wheelchair. Thus, the wheelchair can be movable along a horizontal path when the wheels engage the ground and can be moved along an inclined path, such as a stairway or a ramp, when the tracks are in engagement with the surface. The wheels and tracks are motor driven and suitable controls are provided to allow for forward and reverse movements of the wheelchair as well as for turning movements of the wheelchair.

In U.S. Pat. No. 4,671,369, an improvement for the wheelchair has been described wherein a pair of cushioning arms and fluid piston and cylinder assemblies operate to avoid rapid downward movements of the front and the rear of the wheelchair as the wheelchair moves from a horizontal path to an inclined path or from an inclined path to a horizontal path. The arms which effect the cushioning of the wheelchair often drag on the surface below the wheelchair as the wheelchair moves along the surface. It would be desirable to control the positions of the arms when the arms are not in use for cushioning purposes, i.e., when the wheelchairs move over a horizontal surface. Thus, a need exits for improvements in the controlling of the positions of the arms of a wheelchair of the type described and the present invention satisfies this need.

SUMMARY OF THE INVENTION

The present invention comprises a latch for each of the cushioning arms, respectively, of the wheelchair of the type described. The latch for each arm includes a first member coupled to the arm and a second member coupled to a fixed support of the wheelchair, with the second member being coupled to the armature of a solenoid which is energized to unlatch the arm from latched relationship with the support when it is desired to use the arm for cushioning purposes.

An ultrasonic sensor coupled to the wheelchair adjacent to each latch, respectively, provides signals to energize the respecting latch solenoid when the arm is to be unlatched. To latch each arm, the adjacent edge margins of the two members are bevelled so that, during upward movement of the arm, such as by movement of the wheelchair from an inclined position to a horizontal position, the members are spread apart and a first spring biases the two members back together in coupled relationship to each other. When the latch solenoid is energized, the second member is moved away from the first member to allow a second spring to pull the arm down and into an unlatched position. A limit switch senses when the arm is latched.

The primary object of the present invention is to provide an improved cushioning mechanism for a stair-climbing wheelchair wherein the mechanism has a latch for latching one or more control arms of the mechanism when the arms are to be unlatched because of their proximity to a surface which is inclined.

Other objects of this invention will become apparent as the following specification progresses, reference being had to the accompanying drawings for an illustration of the invention.

DETAILED DESCRIPTION OF THE PREFERRED EMBODIMENTS

Figure 1:
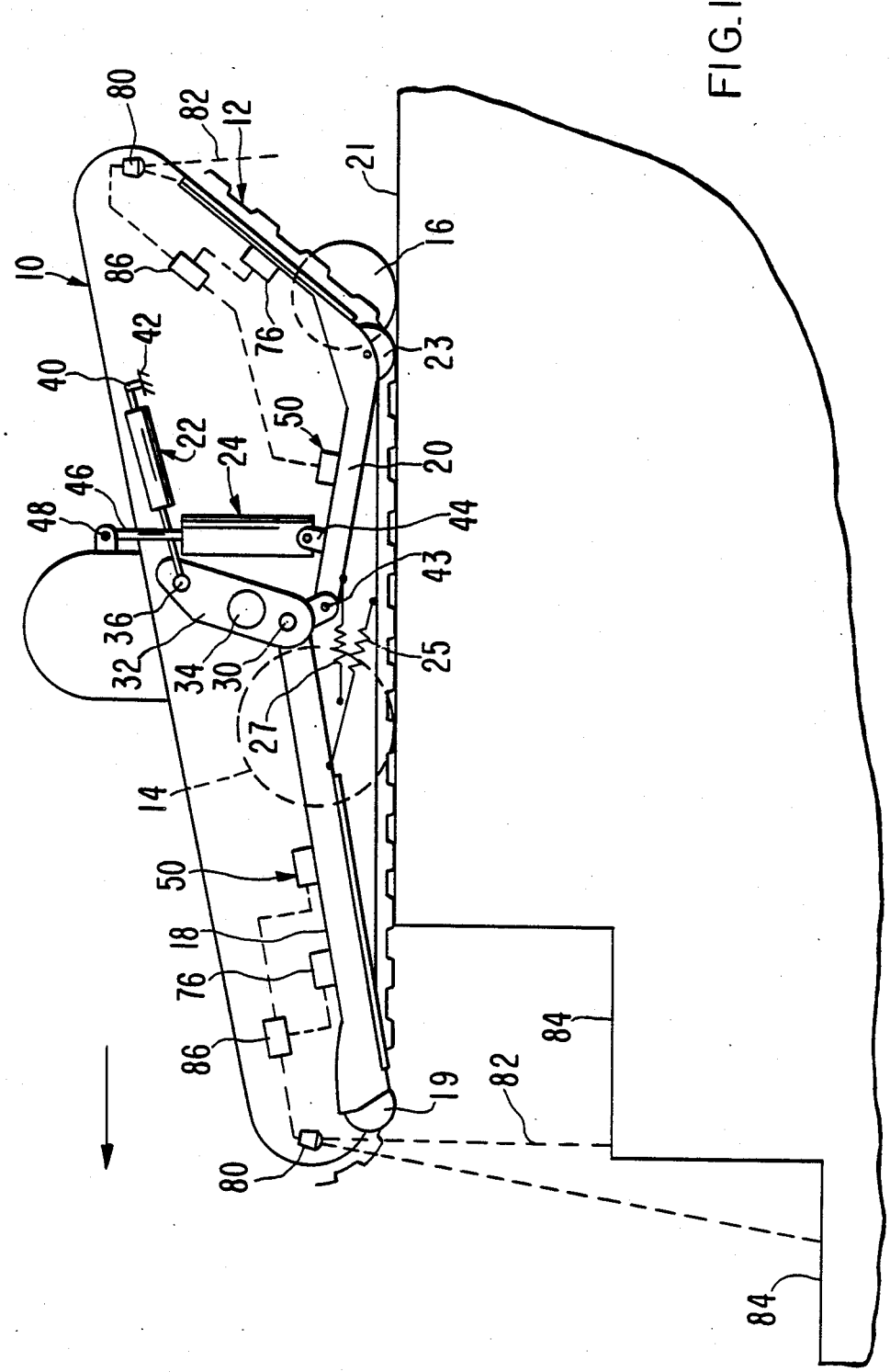
FIG. 1 is a schematic, side elevational view of a stair-climbing wheelchair having the improvements of the present invention thereon with the cushioning arms in their normally up positions and latched by the latch of the present invention.
Figure 2:
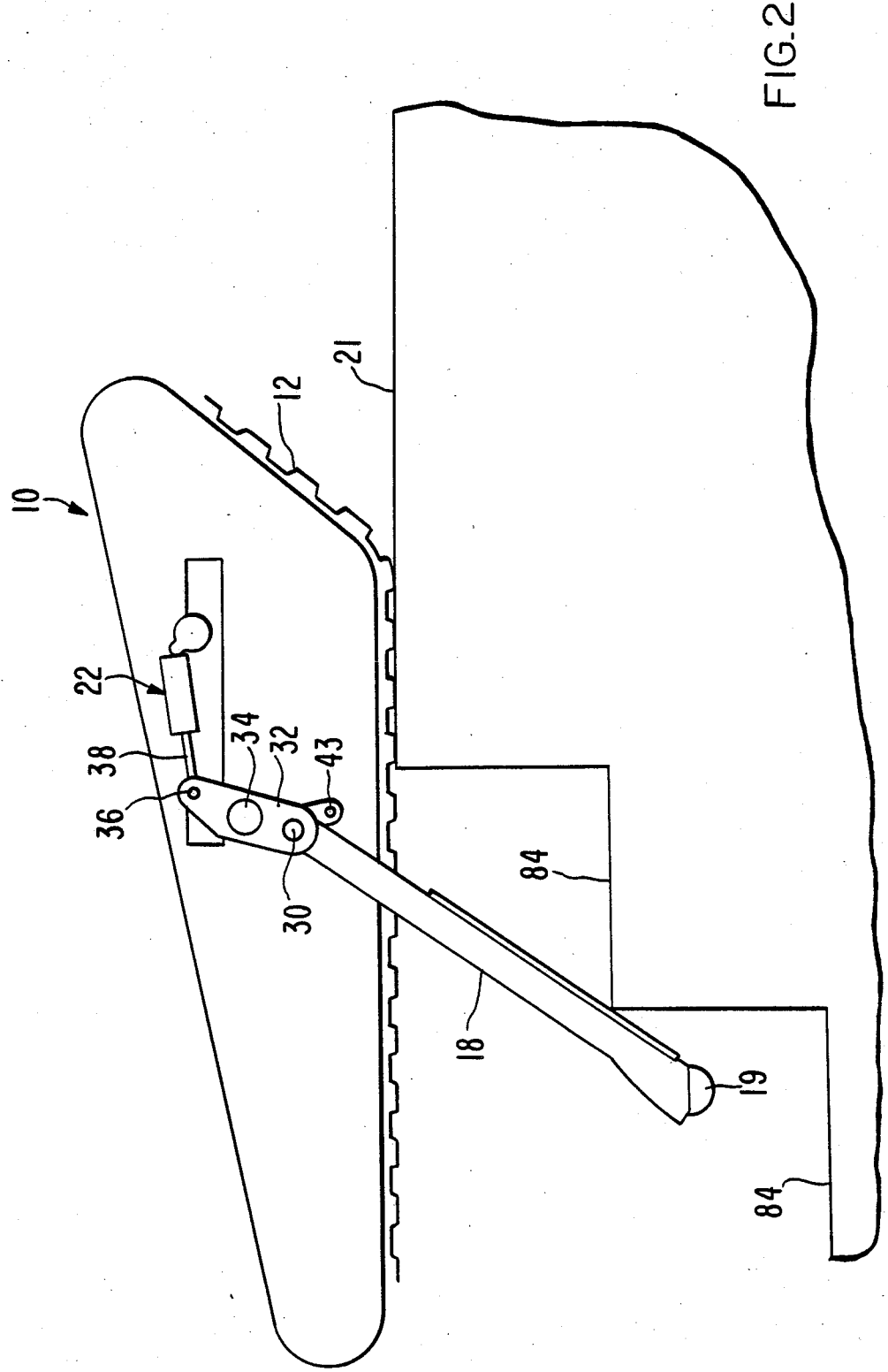
FIG. 2 is a view similar to FIG. 1, but showing the front cushioning arm lowered and unlatched while the wheelchair is about to descend a stairway.
Figure 3:
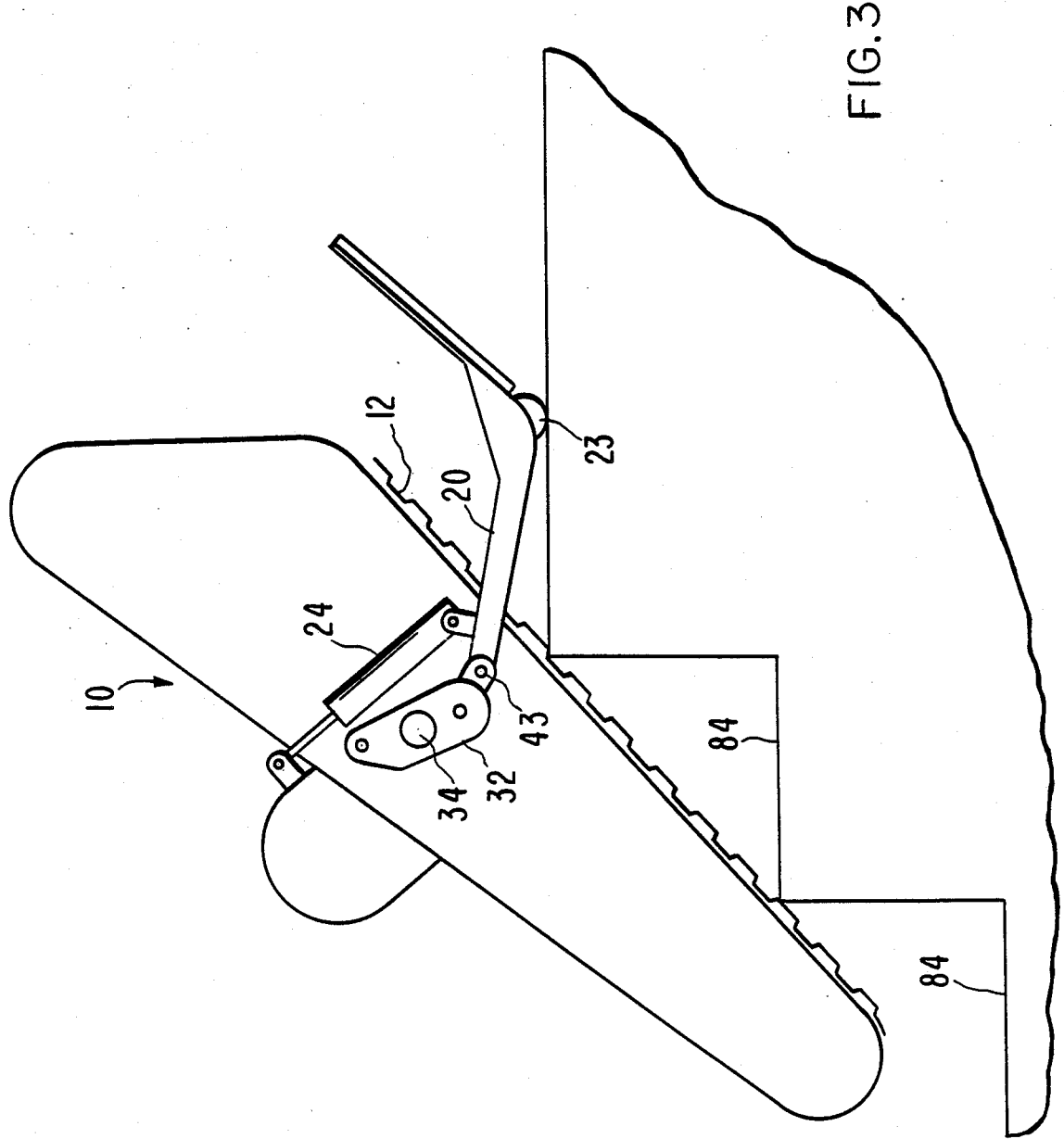
FIG. 3 is a view similar to FIG. 2, but showing the rear cushioning arm for cushioning the movement of the wheelchair as it climbs the stairway and is about to assume a horizontal position on a landing.

The improvements of the present invention relate to a stair-climbing wheelchair of the type disclosed in U.S. Pat. Nos. 4,564,080 and 4,671,369. In such patents, a wheelchair 10 has a pair of endless, flexible tracks 12, only one of which is shown in FIGS. 1–3, and the tracks are used in combination with a pair of wheels 14 and 16. The wheels are coupled with motor structure not shown in FIGS. 1–3 which raises and lowers the wheels relative to the tracks so that the tracks alternately are lowered and raised. FIGS. 1–3 show the tracks 12 in the lowered positions and the wheels 14 and 16 in their up positions. Thus, wheelchair 10 is in a condition to move up or down a ramp or a series of steps forming a stairway. For details regarding the way in which the wheels are raised and lowered, a review of Patent 4,564,080 will suffice and this patent is incorporated herein by reference for such details.

Wheelchair 10 includes cushioning means including arms 18 and 20 at the front and rear parts, respectively, of the wheelchair. Arm 18 is associated with a fluid piston cylinder assembly 22 for cushioning the forward tilting of the wheelchair as it commences to descend a stairway, such as in the manner shown in FIG. 2. Arm 20 has a fluid piston and cylinder assembly 24 which operates with the arm 20 to cushion downward movement of the rear part of the wheelchair as it ascends a stairway and moves into a horizontal position from the inclined position shown in FIG. 3. Details of the operation of the cushioning effects caused by the arms 18 and 20 and assemblies 20 and 24 are found in U.S. Pat. No. 4,671,369, and this patent is incorporated herein by reference for a description of such details.

Arm 18 has an inner end pivotally mounted by a pin 30 on the lower end of a crank arm 32 rotatably mounted on a part 34 forming part of the support structure for the wheelchair. The opposite end of arm 32 is pivotally coupled by pin 36 to a piston rod 38 of fluid piston and cylinder assembly 22, the latter being pivotally coupled via pin 40 to a support anchor point 42 on the wheelchair support structure.

Arm 20 has one end pivotally coupled by a pin 43 to the lower end of member 32. An ear 44 couples arm 20 to fluid piston and cylinder assembly 24 whose piston rod 46 is pivotally coupled by a pin 48 to a projection 50 forming part of the support means of the wheelchair.

The improvement of the present invention comprises a latch 50 for each of arms 18 and 20, respectively. Each latch 50 is shown in more detail in FIG. 4. Each latch includes a first member 52 secured to an upper edge 54 of the corresponding arm, such as arm 18. A second member 56 is pivotally mounted by a pin 58 on a support element 60 of the wheelchair. Member 52 includes a projection 59 which is coupled with a projection 61 of member 56 so that the members 52 and 56 can be latched together when latch 50 is in a latched condition. Support element 60 has a recess 62 therein into which member 56 projects. A tip 64 on element 60 serves as a stop to limit the counterclockwise movement of arm 56 when viewing FIG. 4. The ends of projections 59 and 61 are bevelled to facilitate latching of members 52 and 56.

The armature 66 of a solenoid 68 is pivotally coupled by pin 70 to arm member 56 near projection 61 thereof. A coil spring 72 surrounds armature 66 and biases the same outwardly of the housing of the solenoid 68.

Figure 4:
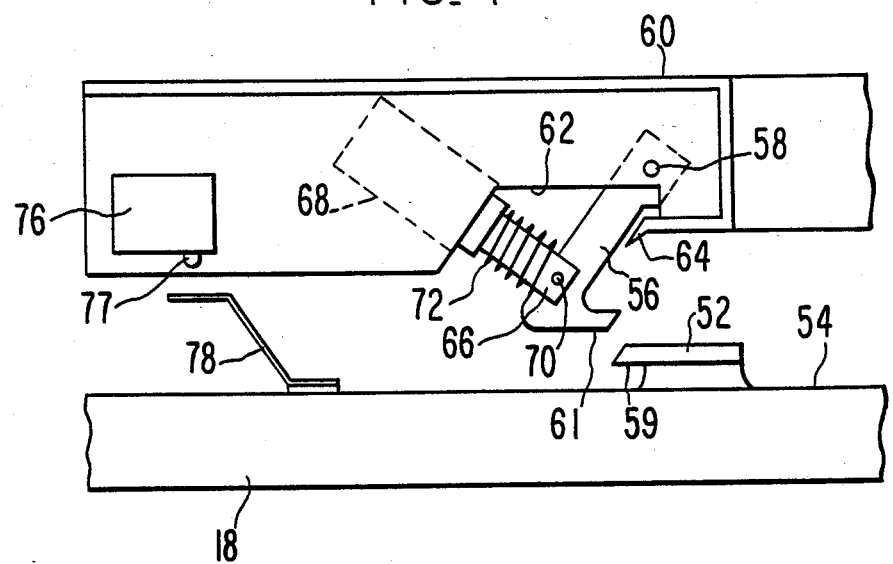
FIG. 4 is an enlarged, fragmentary, schematic view of the latch of the front cushioning arm.
Figure 5:
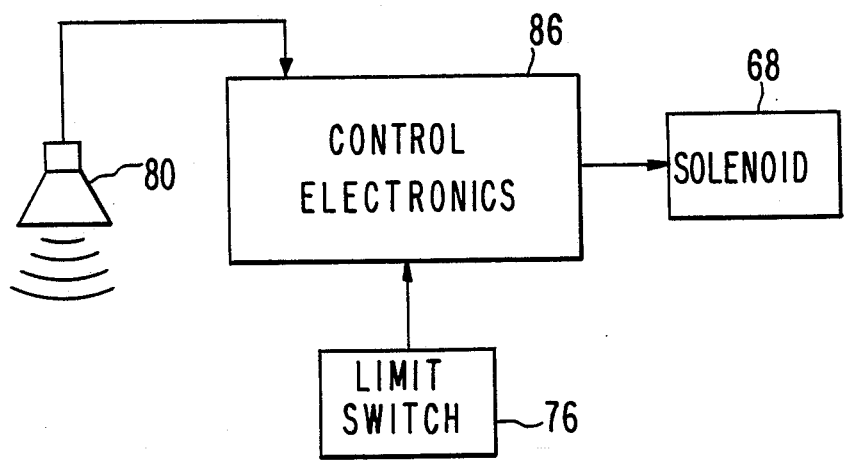
FIG. 5 is a block diagram of the circuitry for controlling the latch and a transducer for sensing the dimensions of adjacent surfaces.

The solenoid is inclined as shown in FIG. 4 to pull arm member 56 in a clockwise sense when it is desired to unlatch the latch 50 of arm 18 and allow the arm to be movable downwardly in its operative mode for cushioning the forward tipping movement of the wheelchair.

A limit switch 76 is secured to one side of support element 60 and is in a position to be engaged by an arm 78 carried by arm 18. Arm 78 engages an actuator 77 of switch 76 when arm 18 moves into its latched position, i.e., when projections 59 and 61 are coupled together. The ends of projections 59 and 61 are bevelled and mate with each other so that as arm 18 is pivoted upwardly (FIG. 4), projection 61 engages projection 59 and moves in a clockwise sense until projection 59 has moved past and overlies projection 61. Spring 72 biases the arm 56 in a counterclockwise sense when viewing FIG. 4 to facilitate the latching of projections 59 and 61.

When the latching is complete, arm 78 will engage actuator 77 to actuate switch 76 which, in turn, will send a signal to a indicator means, signalling to the wheelchair operator that the arm 18 is up and latched. The latching occurs when a roller 19 on the outer end of arm 18 engages a horizontal surface, such as a landing surface 21 (FIG. 1). Similarly, arm 20 will be latched with its latch 50 when a wheel 23 on the outer end of arm 20 (FIG. 1) engages a horizontal surface, such as surface 21 over which the wheelchair moves.

Each end of the wheelchair 10 has an ultrasonic transducer and receiver denoted by the numeral 80 and shown in FIG. 1. Each transducer 80 is directed downwardly so that a sonic signal indicated by arrow 82 (FIG. 1) can sense voids, such as the space above a stairstep 84. The sonic signal is reflected from the surface of the stairstep 84 and returned to transducer 80 which generates a signal coupled to control electronics 86 carried by element 60, and the control electronic is also coupled to solenoid 50 for the particular arm, such as arm 18, and is also coupled to the corresponding limit switch 76. Thus, the control electronics corresponding to a particular arm can operate to automatically, or under manual control, energize the coil of the corresponding solenoid 68 to pull the armature of the solenoid inwardly of the solenoid housing to, in turn, rotate member 56 of latch 50 in a clockwise sense when viewing FIG. 4 to unlatch the latch and allow downward pivotal movement of arm 18 in a counterclockwise sense when viewing FIG. 1.

In operation, assuming the wheelchair is moving in the direction of arrow 100 (FIG. 1) toward a series of stairsteps, and assuming that arms 18 and 20 are latched, the wheelchair is put in a condition such that its wheels 14 and 16 are up and the tracks 12 engage the surface 21. As the wheelchair moves over the upper edge of the stairway, the forward transducer 80 will sense the void defined by the space above the corresponding first stairstep 84, and the transducer will send a signal to the control electronics which will, in turn, energize solenoid 68 and will unlatch the arm and enable the arm to swing down under the influence of a corresponding bias spring 25 (FIG. 1). The wheelchair can then proceed further forwardly and the arm will be in a condition to cushion the pivotal movement of the wheelchair as it moves into position for descending the stairs.

At the bottom of the stairway, the wheelchair will assume a horizontal position and as it approaches the horizontal position, latch 50 will again be latched for arm 18 and the arm will be above the lower surface of tracks 12 so as not to interfere with the forward motion of the wheelchair.

For arm 20, the same unlatching and latching procedure occurs. For instance, as the wheelchair ascends a stairway and as it approaches the upper, landing surface 21, the rear ultrasonic transducer 80 will sense the surface 21 and send a signal to the corresponding control electronics 86 which will, in turn, actuate the corresponding solenoid 56 to unlatch the latch associated with arm 20 and allow the arm 20 to pivot downwardly by a spring 27 (FIG. 1) in clockwise sense when viewing FIG. 1. The arm can then be in a position as shown in FIG. 3 to cushion the clockwise movement of the wheelchair when viewing FIG. 3 as it moves from an inclined position shown in FIG. 3 to a horizontal position shown in FIG. 1.

I claim:

1. In a stair-climbing wheelchair having a front end and a rear end and being capable of moving along an inclined path or a horizontal path;

a support;

means coupled with the support for cushioning the movements of the support as the wheelchair moves from horizontal to inclined positions or from inclined to horizontal positions, said cushioning means including an arm for each end, respectively of the wheelchair, each arm being mounted on said support and having a retracted position and an operative position;

actuatable means on the support and each arm, respectively, for releasably latching the arm to the support in its retracted position; and a control means coupled with the latching means of each arm for actuating the latching means, whereby the arm can move into its operative position.

2. In a wheelchair as set forth in claim 1, said control means includes a solenoid.

3. In a wheelchair as set forth in claim 1, wherein said control means includes a solenoid having an armature, said latching means including a pair of latch members, one of the latch members being pivotally carried by the support and coupled with the solenoid, the other latch member being coupled to a respective arm, said members adapted to be coupled together when the arm is latched.

4. In a wheelchair as set forth in claim 3, wherein the first member is pivotally mounted at one end thereof to the support and is pivotally coupled adjacent to the opposite end thereof to the armature of the solenoid.

5. In a wheelchair as set forth in claim 1, wherein said control means includes a sensor for sensing a dimension of a surface along the path of travel of the wheelchair.

6. In a wheelchair as set forth in claim 5, wherein said sensor includes an ultrasonic transducer.

7. In a wheelchair as set forth in claim 5, wherein said sensor is coupled to the support near the outer end of the arm.

8. In a wheelchair as set forth in claim 5, wherein said latching means for each arm includes a pair of relatively shiftable members having respective projections on the outer ends thereof, said projections being bevelled to permit one member to pivot away from the other member as the two members engage each other and as the respective arm moves toward its retracted position, whereby the two members can be coupled together.

9. In a stair-climbing wheelchair capable of moving along an inclined path or a horizontal path;

a support;

means coupled with the support for cushioning the movements of the support as the wheelchair moves between horizontal and inclined positions, said cushioning means including an arm having a retracted position and an operative position;

actuatable means on the support for releasably latching the arm in its retracted position; and a solenoid having an armature for actuating the latching means, said latching means including a pair of latch members, one of the latch members being pivotally carried by the support and coupled with the solenoid, the other latch member being coupled to the arm, said members adapted to be coupled together when the arm is latched.

10. In a wheelchair as set forth in claim 9, wherein the first member is pivotally mounted at one end thereof to the support and is pivotally coupled adjacent to the opposite end thereof to the armature of the solenoid.

11. In a stair-climbing wheelchair capable of moving along an inclined path or a horizontal path;

a support;

means coupled with the support for cushioning the movements of the support as the wheelchair moves between horizontal and inclined positions, said cushioning means including an arm having a retracted position and an operative position;

actuatable means on the support for releasably latching the arm in its retracted position; and a sensor coupled to the support near the outer end of the arm and coupled with the latching means for actuating the latching means, said sensor being operable for sensing a surface along the path of travel of the wheelchair.

12. In a wheelchair as set forth in claim 11, wherein said sensor includes an ultrasonic transducer.

13. In a stair-climbing wheelchair capable of moving along an inclined path or a horizontal path;

a support;

means coupled with the support for cushioning the movements of the support as the wheelchair moves between horizontal and inclined positions, said cushioning means including an arm having a retracted position and an operative position;

actuatable means on the support for releasably latching the arm in its retracted position; and a control means coupled with the latching means for actuating the latching means, said latching means including a pair of relatively shiftable members having respective projections on the outer ends thereof, one member being on said arm and the other member being on the support, said projections being bevelled to permit one member to pivot away from the other member as the two members engage each other and as the arm moves toward its retracted position, whereby the two members can be coupled together.

* * * * *